United States Patent [19]

Traut

[11] 3,969,005
[45] July 13, 1976

[54] ROLLING CONTACT DEVICES
[76] Inventor: Earl W. Traut, 8040 Palm Lake Drive, Orlando, Fla. 32811
[22] Filed: Dec. 13, 1973
[21] Appl. No.: 424,553

[52] U.S. Cl. .............................. 308/209; 308/215; 308/200
[51] Int. Cl.² ...................................... F16C 19/20
[58] Field of Search .................... 308/215, 209, 200

[56] References Cited
UNITED STATES PATENTS
| | | | |
|---|---|---|---|
| 1,282,888 | 10/1918 | Lippincott | 308/200 |
| 1,289,062 | 12/1918 | Westman | 308/209 |
| 2,854,299 | 9/1958 | Drutowski | 308/209 |

Primary Examiner—M. H. Wood, Jr.
Assistant Examiner—Richard A. Bertsch

[57] ABSTRACT

Rotary radial and axial load bearing devices in which loads are transferred from a race through circularly disposed rotating elements to a second race. Secondary rotating elements are interposed between the load bearing rotating elements to prevent their mutual contact and are in turn held in position by retaining rings fastened to the race opposite their location. All elements are in rolling contact only, so friction is minimized. In some of the devices, secondary rotating elements may carry part of the load; others are capable of rolling contact speed changes.

8 Claims, 26 Drawing Figures

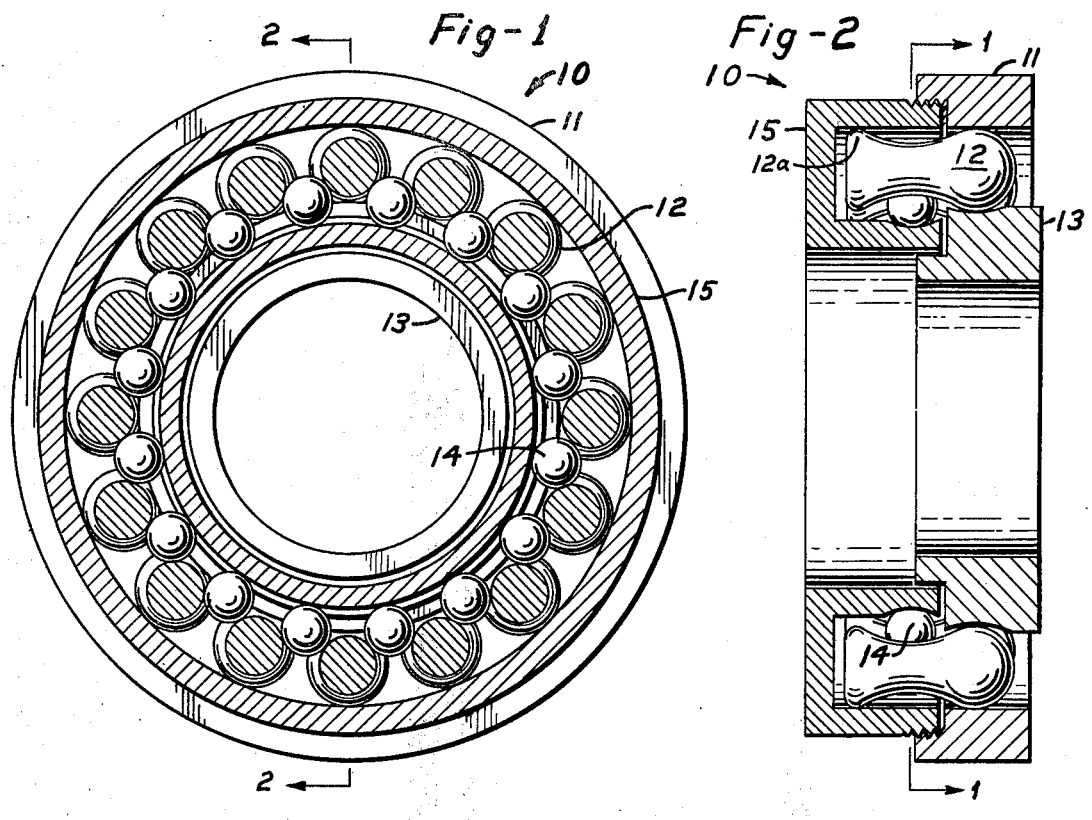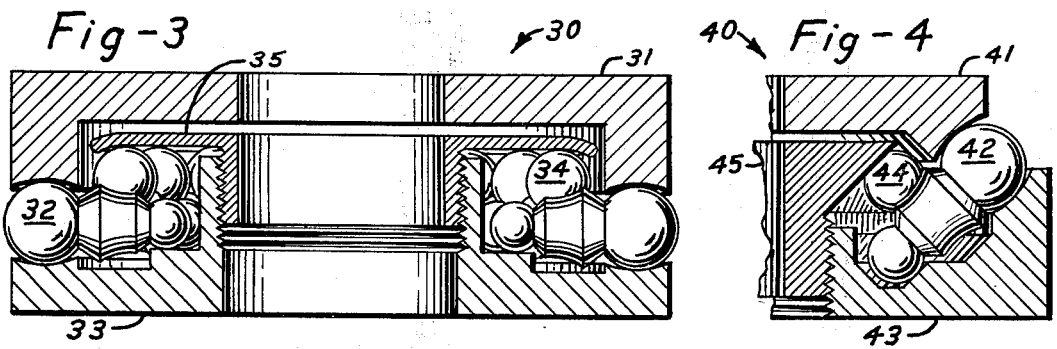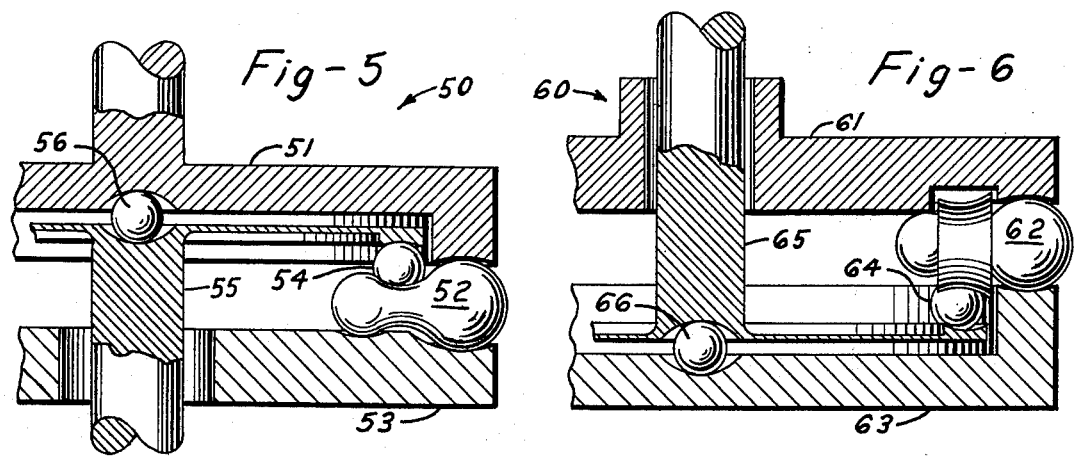

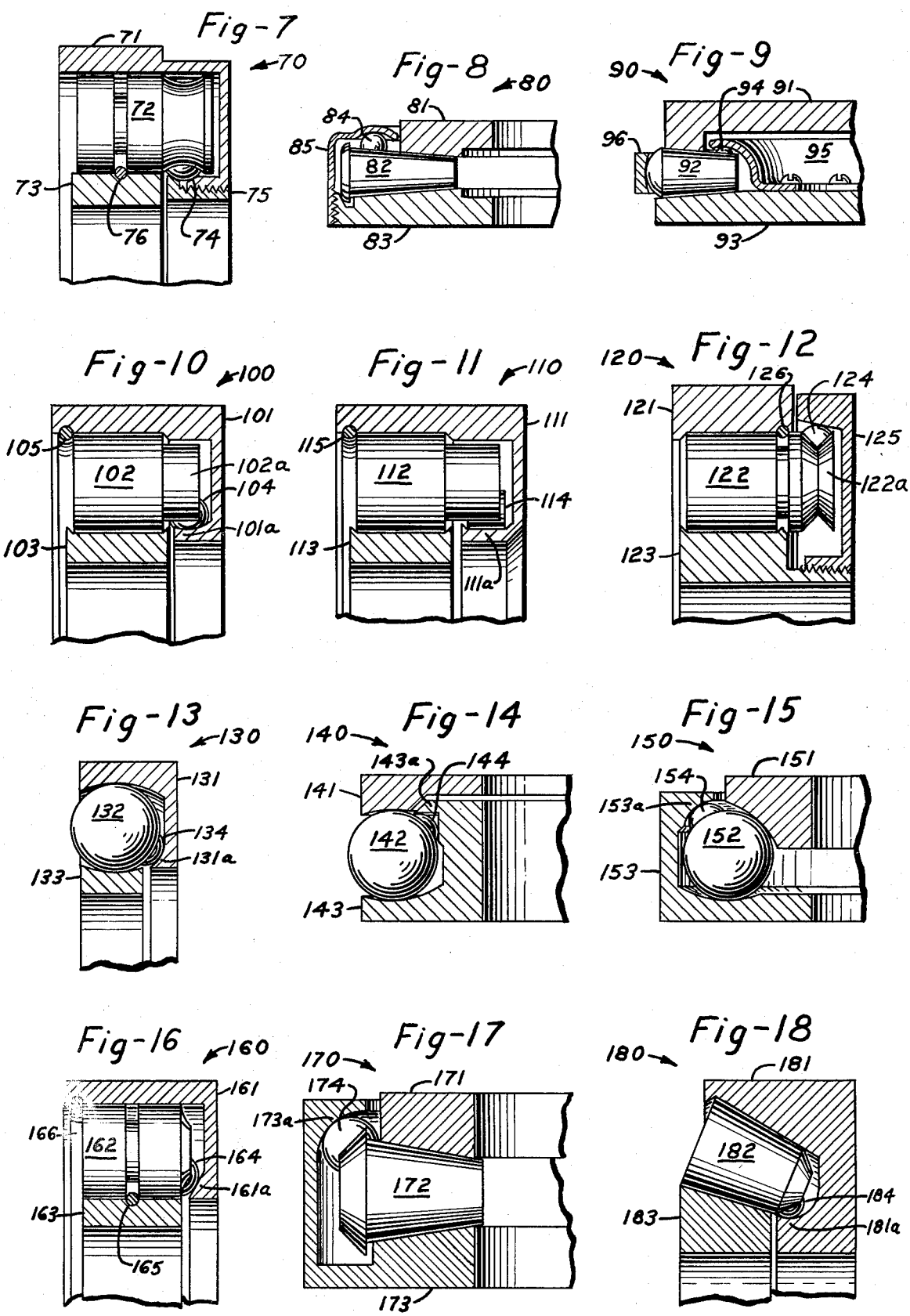

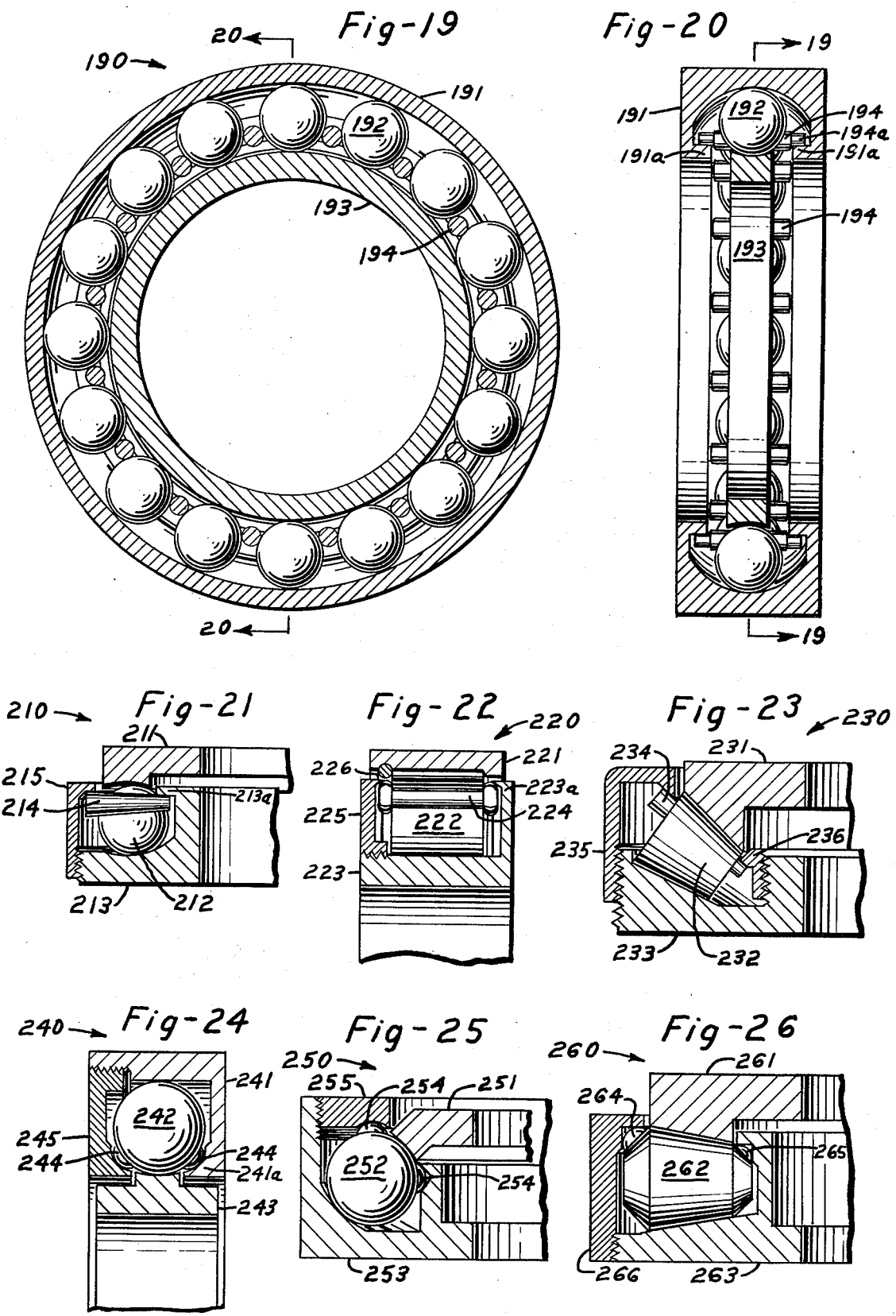

ROLLING CONTACT DEVICES

BACKGROUND OF THE INVENTION

In typical ball or roller bearings the rotating elements slide against each other or slide against a cage. This sliding friction causes heat and wear, and necessitates providing clearances and lubrication in the bearing. In U.S. Pat. No. 1,289,062 issued to A. L. Westman a rolling contact bearing is illustrated, but it is excessively complex in that the rollers are complicated and make more contacts than necessary.

SUMMARY OF THE INVENTION

The invention provides axial and radial load rolling contact bearing devices including two bearing races, major rotating elements which are located between these races and carry the loads, minor rotating elements which prevent contact between the major rotating elements, and retainers for positioning the minor rotating elements. There is only rolling contact between all elements.

In some embodiments the minor rotating elements are located to one side of the major rotating elements with respect to the races, in others they are located on both sides, and in yet others the minor rotating elements pass between the major rotating elements and are supported on both sides. The contact between elements may be rolling point contact as a ball rolling on a flat surface, or rolling line contact as a cylinder rolling on a flat surface. Rolling contact is obtained by locating the minor rotating elements on the side of the major rotating elements generally opposite the side to which their retaining race is attached, and further by properly dimensioning the elements. In some embodiments it is possible to provide speed change devices by using dimensions that will provide to one of the retaining races a speed differential with respect to the race to which it would otherwise be attached, and by then permitting this retaining race to rotate independently. In other embodiments the minor rotating elements may carry part of the load.

Accordingly, it is an object of the present invention to provide an improved rolling contact bearing without sliding friction. Another object of the invention is to provide a rolling contact bearing in which there are zero clearances between elements, thus providing for exact centering of rotating shafts with no displacement due to clearances.

A further object of the invention is to provide a rolling contact device wherein speed ratios between rotating elements ranging from infinitely small to infinitely large can be obtained without sliding friction and without clearances between the elements of the device.

A still further object of the invention is to provide rolling contact devices wherein the rotating elements are simple spheres and cylinders, to thus minimize the manufacturing cost.

Yet another object of the invention is to provide rolling contact bearing devices wherein loads are distributed between major and minor rotating elements.

Other objects of this invention will appear from the following description and appended claims, reference being had to the accompanying drawings forming a part of this specification wherein like reference characters designate corresponding parts in the several views.

FIG. 1 is a vertical sectional view of a radial load rolling contact bearing wherein loads are transferred through spherical ends of rollers and balls are used to provide separation between these rollers in accordance with one embodiment of the invention.

FIG. 2 is a sectional view taken along line 2—2 of FIG. 1 and looking in the direction of the arrows.

FIG. 3 is a vertical sectional view of a device similar to FIG. 1 in which axial bearing loads are accommodated instead of radial loads.

FIG. 4 is a vertical sectional view of the right portion of a device similar to FIG. 1 in which both radial and axial bearing loads are accommodated instead of only radial loads.

FIG. 5 is a vertical sectional view of the central and right portions of a device similar to FIG. 3, but in which speed changes are obtained in accordance with another embodiment of the invention.

FIG. 6 is a vertical sectional view of the central and right portions of a device similar to FIG. 5 in which speed changes are obtained.

FIG. 7 is a vertical sectional view of the upper portion of a radial load rolling contact bearing similar to FIG. 1 in which loads are transferred through rollers instead of balls.

FIG. 8 is a vertical sectional view of the left portion of a device similar to FIG. 7 in which axial bearing loads are accommodated instead of radial loads.

FIG. 9 is a vertical sectional view of the left portion of a device similar to FIG. 8 in which radially outward movement of the load bearing rollers is prevented by a rotating retaining ring instead of by a stationary retaining ring.

FIG. 10 is a vertical sectional view of the upper portion of a radial load rolling contact device similar to FIG. 7 in which the separating balls contact axial extensions of the load bearing rollers instead of a groove in the load bearing rollers in accordance with another embodiment of the invention.

FIG. 11 is a vertical sectional view of the upper portion of a device similar to FIG. 10 in which the separating elements are rollers instead of balls.

FIG. 12 is a vertical sectional view of the upper portion of a device similar to FIG. 10 in which the separating balls are located radially outwards of the load bearing rollers instead of radially inwards and in which the separating balls roll in grooves in the load bearing rollers.

FIG. 13 is a vertical sectional view of the upper portion of a radial load rolling contact device in which both major and minor rotating elements are balls in accordance with another embodiment of the invention.

FIG. 14 is a vertical sectional view of the left portion of a device similar to FIG. 13 in which axial bearing loads are accommodated instead of radial loads.

FIG. 15 is a vertical sectional view of the left portion of a device similar to FIG. 13 accommodating both radial and axial bearing loads.

FIG. 16 is a vertical sectional view of the upper portion of a device similar to FIG. 13 in which the load bearing elements are rollers instead of balls.

FIG. 17 is a vertical sectional view of the left portion of a device similar to FIG. 16 in which axial bearing loads are accommodated instead of radial loads.

FIG. 18 is a vertical sectional view of the upper portion of a device similar to FIG. 16 in which both radial and axial bearing loads are accommodated.

FIG. 19 is a vertical sectional view of a radial load rolling contact bearing in which the minor rotating elements are rollers supported on both sides of the major rotating elements in accordance with another embodiment of the invention.

FIG. 20 is a sectional view taken along the line 20—20 of FIG. 19 and looking in the direction of the arrows.

FIG. 21 is a vertical sectional view of the left portion of a device similar to FIG. 19 in which axial bearing loads are accommodated instead of radial loads.

FIG. 22 is a vertical sectional view of the upper portion of a device similar to FIG. 20 in which the load bearing elements are rollers instead of balls and in which the minor rotating elements are located radially outwards of the load bearing elements instead of radially inwards.

FIG. 23 is a vertical sectional view of the left portion of a device similar to FIG. 22 in which both axial and radial loads are accommodated instead of only radial loads.

FIG. 24 is a vertical sectional view of the upper portion of a radial load rolling contact device in which both the load bearing rotating elements and the secondary rotating elements are balls and in which the secondary balls are located on both sides of the load bearing balls in accordance with another embodiment of the invention.

FIG. 25 is a vertical sectional view of the left portion of a device similar to FIG. 24 in which both radial and axial loads are accommodated instead of only radial loads.

FIG. 26 is a vertical sectional view of the left portion of a device similar to FIG. 24 in which the load bearing elements are rollers instead of balls and in which axial loads are accommodated instead of radial loads.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Turning now to FIGS. 1 and 2 there is shown device 10 which is a radial load rolling contact bearing, there being no sliding contact present. Radial loads are transferred from a circular surface on outer race 11 through the spherical ends of rollers 12, which comprise the major rotating elements, to a circular surface on inner race 13. Balls 14 are the minor rotating elements and are alternately interposed between rollers 12, rolling against the constricted portion of their sides to prevent their touching each other. Balls 14 also roll in a groove in circular retaining race 15 and are held in position thereby. The blunt ends 12a of rollers 12 have the same diameter as their spherical ends, and roll on a circular surface on the inner periphery of retaining race 15, which has the same diameter as the inner periphery of outer race 11. Retaining race 15 is adjustably screwed onto outer race 11, but could be otherwise fastened thereto. Please note that the elements of this radial load device are oriented generally perpendicular to its axis. Note too that balls 14 and race 15 carry none of the load because races 11 and 13 are on opposite sides of the spherical ends of rollers 12.

All elements of device 10 will be in rolling contact provided there is no mechanical interference and provided the following dimensional proportions are observed:

$$\frac{D_1}{D_2} = \frac{d_1}{d_2};$$

where $D_1$ is the diameter of the inner periphery of race 11 where it contacts rollers 12, $D_2$ is the diameter of the groove in retaining race 15 where it contacts balls 14, $d_1$ is the major diameter of rollers 12, and $d_2$ is the diameter of the constricted midsection of rollers 12 where they contact balls 14.

Device 30 of FIG. 3 is similar to device 10, but is instead an axial load rolling contact bearing. Loads are transferred axially from upper race 31 through the large ends of rollers 32 to lower race 33. The smaller ends of rollers 32 roll on a radially inward surface of race 33. Balls 34 are interposed between rollers 32, contacting them on their concave central portion and being held in position by retaining race 35. Race 35 is adjustable and may be used to provide positive clearance, zero clearance, or pressure between the elements, depending on how far race 35 is screwed onto race 33. All elements will be in rolling contact if their diameters of rolling contact are proportional to their distance from the device 30 axis and if the axes of rollers 32 are perpendicular to this axis.

FIG. 4 depicts device 40 which is a combination of devices 10 and 30 in that it will accommodate both axial and radial loads. The large ends of rollers 42 are in rolling contact with races 41 and 43 and transfer loads therebetween. The small ends of rollers 42 roll on a radially inward surface of race 43. Adjustable retaining race 45 screws onto race 43 and holds balls 44 in position between rollers 42. Only one roller 42 and one ball are shown in FIG. 4, but there would be many more of each.

In FIG. 5 is shown device 50 which is a rolling contact speed-change device. It is similar to device 30, except that the narrow central portion of each roller has a diameter less than that optimum which would cause the retaining race to remain stationary with respect to the lower race. In device 50 axial loads are transferred from rotating upper race 51 through the large ends of rollers 52 to stationary lower race 53. The small ends of rollers 52 roll on a radially inward surface of lower race 53. Balls 54 are interposed between the narrow portions of rollers 52 and are held in position by retaining race 55. However, the central portion of rollers 52 is only about half the optimum diameter; thus race 55 will rotate at about half the speed of upper race 51, and in the same direction. Ball 56 is positioned along the rotating axis of device 50 in recesses in the center of races 51 and 55 and may be used to transfer a portion of the axial load through the bending of the disc portion of race 55 to balls 54 and from thence to rollers 52 and thereafter to lower race 53.

In device 50 it can be seen that when race 51 is the driving element, the speed of race 55 will decrease as the diameter of the central portion of rollers 52 increases until the optimum diameter is reached, at which diameter the speed of race 55 will be zero with respect to lower race 53. However, if race 55 is the driving element, the speed of race 51 will increase as the diameter of the central portion of rollers 52 increases until the optimum is reached, at which diameter the speed of race 51 will theoretically be infinite;

actually slippage instead of rotation will occur at diameters near the optimum.

If the shaft is removed from race 55 or is not utilized, device 50 becomes an axial load bearing with race 55 simply being a freely rotating retainer. The size of the central portion of rollers 52 in this event will not matter, provided each is the same diameter.

Device 60 of FIG. 6 is another rolling contact speed change device, and is essentially what would be obtained by inverting device 50 and holding race 51 stationary. Device 60 differs further in that it provides concentric shafts at the same end of the bearing. Loads are transferred from race 61 through the large ends of rollers 62 to lower race 63. Balls 64 are interposed between rollers 62 and held in position by retaining race 65 which is free to rotate and is held in position by ball 66 at the axis of the bearing. Note that the diameter of the central portion of roller 62 is larger than the optimum and thus races 61 and 65 will rotate in opposite directions; whereas in device 50 with a central diameter less than the optimum, races 51 and 55 have the same direction of rotation. When race 61 is the driving element and lower race 63 is stationary, speed differentials down to zero may be obtained between races 61 and 65; extremely high speed differentials being theoretically possible when race 65 is the driving element.

FIGS. 7, 8, and 9 depict devices which are similar to those of FIGS. 1, 2, 3, and 4, except the load bearing elements are rollers instead of balls and thus the load bearing contacts are lines instead of points.

In FIG. 7, device 70 is a radial load rolling contact bearing in which loads are transferred from outer race 71 through rollers 72 to inner race 73. Balls 74 roll between rollers 73 in concave grooves at one of their ends and are held in position by rolling also in an adjustable V-groove which is formed between a radially inward extension of outer race 71 and retaining race 75; adjustment being provided by the extent to which the two are screwed together. Snap ring 76 prevents axial movement between rollers 72 and inner race 73.

Rolling contact bearing 80 of FIG. 8 is similar to bearing 70 except that it is an axial load bearing. Upper race 81 transfers loads through rollers 82 to lower race 83 by rolling line contact. Rollers 82 have a rounded portion at one end which is in rolling point contact with a reverse slope portion of lower race 83 which prevents them from shifting radially outwards. Balls 84 are interposed between rollers 82 to preclude their mutual contact. Retaining race 85 is screwed onto lower race 83 and has a concave portion which is in rolling contact with balls 84 and holds them in position. Race 85 may be made of thin, flexible material so as to exert a readily adjustable amount of pressure on rollers 82.

Combination radial and axial load bearings similar to devices 70 or 80 may be obtained by tilting the rollers to a position intermediate to them and by using a retainer similar to either device.

FIG. 9 shows device 90 which is an axial load bearing similar to device 80 but using a moving ring to prevent radially outward movement of the rollers. In device 90, upper race 91 is in rolling line contact with rollers 92, which are also in rolling line contact with lower race 93. Separating balls 94 are held in position by retaining race 95 which is shown fastened to lower race 93. The rounded, radially outward ends of rollers 92 are in point contact with concave retainer ring 96 which is free to rotate and prevents rollers 92 from moving radially outwards.

FIGS. 10, 11 and 12 depict devices 100, 110, and 120 which are similar to device 70, except that the minor rotating elements contact axial extensions of the major rotating elements instead of a portion between their ends.

In FIG. 10, device 100 has an outer race 101 which transfers radial loads to inner race 103 by means of rolling line contact with rollers 102. Balls 104 are interposed between axial extensions 102a at one end of rollers 102, and are held in position therebetween by concave retaining race 101a, which is an extension of race 101. Snap ring 105 prevents axial shifting of the rollers 102 with respect to outer race 101. Both axial and combination radial-axial load variations of device 100 are also possible.

A major variation of device 100 would be to increase the diameter of axial extensions 102a so that they have a greater diameter than the load bearing portion of rollers 102 and then interposing balls 104 radially outwards between extensions 102a instead of radially inwards. The retaining race would then be attached to inner race 103 instead of to outer race 101, as in the device of FIG. 12, which will be discussed later.

FIG. 11 represents device 110 which is similar to FIG. 10, except that the interposed elements are rollers instead of balls. Outer race 111 transfers radial loads through rollers 112 to inner race 113. Interposed rollers 114 are held in position by retaining race 111a, which is integral with race 111. Snap ring 115 holds rollers 112 in position.

FIG. 12 shows device 120 which is similar to device 100 and to the major variation there described. In device 120 the interposed balls are located radially outwards instead of radially inwards of the centerlines of the load bearing rollers, and the retaining race is fastened to the inner instead of the outer race. Device 120 has an outer race 121 in rolling line contact with rollers 122, which in turn roll against inner race 123. Balls 124 are interposed between the V-notched ends 122a of rollers 122 and are held in position by retaining race 125, which is screwed onto inner race 123. Note that the inner periphery of retaining race 125 is tapered where it contacts balls 124 and thus provides a means of adjusting the bearing. Note also that each ball 124 has two points of contact with adjacent rollers 122.

FIGS. 13, 14, and 15 depict rolling point contact devices wherein both the load bearing rotating elements and the secondary rotating elements are balls. In FIG. 13, device 130 is a radial load rolling contact bearing in which outer race 131 transfers loads through balls 132 to inner race 133. Balls 134 are interposed between balls 132 and are held in position by retaining race 131a which is attached to or integral with outer race 131.

All elements will be in rolling contact and balls 132 will not twist as they rotate if the following dimensional proportions are observed:

$$\frac{D_1}{D_2} = \frac{d_1}{d_2};$$

where $D_1$ is the diameter of the inner periphery of race 131, $D_2$ is the diameter of the circle of contact of race 131a where it contacts balls 134, $d_1$ is the diameter of balls 132, and $d_2$ is the diameter of the circular loci on balls 132 where they contact balls 134. For some applications a minor deviation from this proportion may be desireable in that such deviation will cause balls 132 to twist as they rotate, thus theoretically assuring that every portion of the surface of balls 132 will at one time or another bear the load and that wear will thus be evenly distributed over their surface.

In a variation of device 130, race 133 would be shifted slightly clockwise so that it contacts balls 132 at a greater distance from retaining race 131a. This will give the bearing an axial load bearing capability and will cause balls 134 and race 131a to carry such axial load.

FIG. 14 depicts device 140 which is an axial load variation of device 130. Loads are transferred from upper race 141 through balls 142 to lower race 143. Interposed balls 144 are held in position by a V-groove in retaining race 143a, which is integral with race 143.

Device 150 of FIG. 15 is both an axial load and a radial load bearing. The loads are transferred from upper race 151 to balls 152. Axial loads are transferred from balls 152 to lower race 153, which is not directly opposite race 151. The radial loads are transferred through interposed balls 154 to retaining race 153a, which is fastened to lower race 153. In a variation of this device the entire load may be transferred directly to race 153 by shifting its concave surface clockwise so that it contacts balls 152 opposite their points of contact with upper race 151; then balls 154 will carry no load but will only serve to position balls 152.

FIGS. 16, 17, and 18 show devices similar to those of FIGS. 13, 14, and 15 respectively, differing primarily in that the load bearing elements are rollers instead of balls. In FIG. 16, device 160 is a radial load rolling contact bearing in which loads are transferred from outer race 161 through rollers 162 to inner race 163. Balls 164 are interposed between concave end portions of rollers 162 and are held in position by race 161a, which is integral with race 161. Snap rings 165 and 166 prevent axial shifting of the elements.

FIG. 17 shows device 170 which is an axial load variation of device 160. Loads are transferred from upper race 171 through rollers 172 to lower race 173. Balls 174 are interposed between the conically shaped ends of rollers 172 and serve both to separate them and to prevent their radially outward movement. Retaining race 173a is integral with race 173 and holds balls 174 in position.

FIG. 18 depicts device 180, which is essentially a combination of devices 160 and 170. In FIG. 18, both radial and axial loads are transferred between races 181 and 183 through rolling line contact with rollers 182. Interposed balls 184 roll on conical ends of rollers 182 and are held in position by retaining race 181a which is integral with race 181.

All of the rolling contact devices thus far described have interposed rolling elements supported on only one side of the main load bearing elements. The remainder of the devices to be described all have their interposed rotating elements supported on both sides of the major rotating elements, either in the form of rollers which are supported on both sides or as balls located on both sides. It should be noted that there is only one point or line contact between adjacent rotating elements, although more may be possible. The rollers may be in one piece or made up of several parts.

FIGS. 19 and 20 show device 190 which is a radial load rolling point contact bearing in which loads are transferred between outer race 191 and inner race 193 through balls 192. Rollers 194 are placed between rollers 192 to keep them from touching each other. Retaining races 191a are integral with race 191 and are in rolling contact with the reduced diameter ends 194a of rollers 194, holding them radially outwards between rollers 192. Although means are not shown for assembly, this may be accomplished in several ways, such as by making one of the retaining races 191a removable.

All elements will be in rolling contact if the following dimensional relationships are observed:

$$\frac{D_1}{D_2} = \frac{d_1}{d_2};$$

where $D_1$ is the inner diameter of race 191 where it contacts balls 192, $D_2$ is the outer diameter of retaining races 191a where they contact rollers 194a, $d_1$ is the major diameter of rollers 194, and $d_2$ is the diameter of roller ends 194a.

Device 210 of FIG. 21 is an axial load variation of device 190 in which balls 212 are in rolling contact with races 211 and 213. Interposed rollers 214 are held in position by races 214a and 215. Rolling contact of all elements is assured if roller 214 is in the shape of a truncate cone perpendicular to the axis of the bearing and whose apex, if extended, would coincide with the axis of the bearing. Bearings intermediate to devices 190 and 210 are quite practical and would result in bearings with both radial and axial load capability.

FIG. 22 depicts device 220 which is a radial load bearing similar to that of device 190, except that the main load bearing elements are rollers instead of balls, and the axes of the intervening minor rollers are located radially outward of the axes of the load bearing rollers instead of radially inward of them. In device 220, loads are transferred from outer race 221 through rollers 222 to inner race 223. Interposed rollers 224 have enlarged ends which are in rolling contact on one side with retaining race 223a on the other side with adjustable retaining race 225. Snap ring 226 holds rollers 222 in position with respect to race 221.

FIG. 23 shows device 230 which is a combination radial and axial load bearing similar to device 220. Loads are transferred between races 231 and 233 through rollers 232. Tapered rollers 234 are located between rollers 232 to keep them apart, and are held in positon by adjustable retaining races 235 and 236. In an axial load variation of this device, rollers 232 and 234 would be oriented horizontally.

Device 240 of FIG. 24 has balls as load bearing elements and instead of rollers to separate them, two series of balls are used, one series on each side. Loads are transferred from outer race 241 through balls 242 to inner race 243. One series of balls 244 is interposed balls 242 on one side and held in position by retaining race 241a, and the other series of balls 224 is interposed between balls 242 on their other side and held in position by adjustable retaining race 245.

FIG. 25 shows device 250 which is similar to device 240, except that it is a combination radial and axial load bearing. Loads are transferred from race 251 through balls 252 to another race 253. Balls 252 are separated on one side by a series of balls 254 which also roll in a V-groove on the inner hub of race 253 and are held in position therewith. A second series of balls 254 is interposed between balls 252 on their upper side, this series of balls being held in position by their contact with a concave groove in adjustable retaining race 255.

Device 260 of FIG. 26 is an axial load rolling contact bearing similar to devices 240 and 250, except that the load bearing elements are rollers instead of balls. Loads are transferred from race 261 through rollers 262 to race 263. Balls 264 rotate between the outer ends of rollers 262 and are held in position by V-grooved adjustable retaining race 266. Balls 265, which are shown as smaller in size than balls 264 but could be the same size, rotate between the inner ends of rollers 262 and are held in position by another V-grooved retaining race which is shown as integral with race 263.

Radial and axial load bearings similar to device 260 may be had by shifting the angle of the axes of rollers 262 with respect to the axis of the bearing, and by changing the locations of the other elements to suit.

I claim:

1. A rolling contact device comprising:
    at least two bearing races,
    said bearing races including circular surfaces,
    first rotating means,
    said first rotating means including a plurality of major rotating elements in rolling contact with said circular surfaces of said races,
    second rotating means,
    said second rotating means including a plurality of minor rotating elements alternately interposed between said major rotating elements to prevent their mutual contact and engaging the same in rolling contact,
    circular retaining means,
    said circular retaining means being in rolling contact with said secondary rotating means and serving to hold the same in position,
    there being only one contact between adjacent rotating elements,
    there being no sliding contact in said device.

2. The rolling contact device as claimed in claim 1 in which said rotating elements include balls.

3. The rolling contact device as claimed in claim 1 in which said rotating elements include rollers.

4. The rolling contact device as claimed in claim 1 in which the sides of said major rotating elements contact said minor rotating elements.

5. The rolling contact device as claimed in claim 1 in which said retaining means includes at least one circular race attached to one of first named races.

6. The rolling contact device as claimed in claim 1 in which said circular surfaces of two of said races contact said first rotating means on opposite sides thereof, so that the entire load will be transferred therebetween.

7. The rolling contact device as claimed in claim 1 in which said elements are oriented generally perpendicular to the axis of said device, so as to provide a radial load bearing device.

8. A rolling contact device comprising:
    at least two bearing races,
    said bearing races including circular surfaces,
    first rotating means,
    said first rotating means including a plurality of major rotating elements in rolling contact with said circular surfaces of said races,
    second rotating means,
    said second rotating means including a plurality of minor rotating elements alternately interposed between said major rotating elements to prevent their mutual contact and engaging the same in rolling contact,
    a circular retaining race,
    said circular retaining race being in rolling contact with said secondary rotating means and serving to hold the same in position,
    there being only rolling contact in said device.

* * * * *